(12) United States Patent
Kawakatsu et al.

(10) Patent No.: US 6,907,072 B2
(45) Date of Patent: Jun. 14, 2005

(54) MOVING IMAGE ENCODING APPARATUS

(75) Inventors: Hirokazu Kawakatsu, Yokohama (JP); Atsushi Asano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 10/148,185

(22) PCT Filed: Dec. 14, 2000

(86) PCT No.: PCT/JP00/08872

§ 371 (c)(1),
(2), (4) Date: Jun. 6, 2002

(87) PCT Pub. No.: WO01/45423

PCT Pub. Date: Jun. 21, 2001

(65) Prior Publication Data

US 2002/0172283 A1 Nov. 21, 2002

(30) Foreign Application Priority Data

Dec. 14, 1999 (JP) ............................................ 11-355115

(51) Int. Cl.$^7$ ................................................ H04B 1/66
(52) U.S. Cl. ................................................ 375/240.13
(58) Field of Search ........................ 375/240.01, 240.02, 375/240.03, 240.13; 348/700; H04N 1/66

(56) References Cited

U.S. PATENT DOCUMENTS

| 5,333,137 | A | | 7/1994 | Fujiyama | |
|---|---|---|---|---|---|
| 5,486,863 | A | * | 1/1996 | Auyeung et al. | ...... 375/240.24 |
| 5,818,537 | A | | 10/1998 | Enokida et al. | |
| 5,883,672 | A | | 3/1999 | Ando et al. | |
| 5,926,232 | A | | 7/1999 | Pelz et al. | |
| 5,959,672 | A | | 9/1999 | Sasaki | |
| 6,057,893 | A | * | 5/2000 | Kojima et al. | ............... 348/700 |
| 6,167,087 | A | * | 12/2000 | Kato | ...................... 375/240.03 |

FOREIGN PATENT DOCUMENTS

| EP | 0 538 013 | 4/1993 |
|---|---|---|
| EP | 0 763 944 | 3/1997 |
| FR | 2 691 272 | 11/1993 |
| JP | 07 095564 | 4/1995 |
| JP | 10-327413 | 12/1998 |
| WO | 99 52296 | 10/1999 |
| WO | 00 08861 | 2/2000 |

OTHER PUBLICATIONS

T. Hamada et al.: "Coefficient–based adaptive transform coding scheme", Electronics & Communications in Japan, Part I—Communications, vol. 79, No. 8, pp. 50–63, Aug. 1, 1996.

* cited by examiner

*Primary Examiner*—Tung Vo
(74) *Attorney, Agent, or Firm*—Oblon, Spivak, McClelland, Maier & Neustadt, P.C.

(57) ABSTRACT

In a moving image encoding apparatus of this invention, a generated bit amount extracting section (21) counts generated bits of variable-length-encoded data in units of macroblocks, and a reference generated bit count is set in a parameter value control section (22) as an update condition for a parameter value in each block. The boundary value of the parameter value is set in an intra/inter determination section (23) as a criterion for selection of the intra-encoding mode. In the inter-frame encoding mode, the parameter value control section (22) updates the parameter value of a block in which the generated bit count value of encoded data obtained by the generated bit amount extracting section (21) exceeds a reference value. The intra/inter determination section (23) determines that the influence of a data error is large in a block in which the parameter value is continuously updated and exceeds the boundary value, and switches the current mode to the intra-encoding mode to perform refresh operation.

7 Claims, 8 Drawing Sheets

MOVING IMAGE ENCODING APPARATUS

TECHNICAL FIELD

The present invention relates to a moving image encoding apparatus for compressing and encoding a video signal (to be referred to as a moving image signal hereinafter) of a moving image with high efficiency.

BACKGROUND ART

A conventional moving image encoding apparatus is designed to compress and encode a moving image signal with high efficiency by using the statistical characteristics of a moving image signal, i.e., correlations between intraframe pixels and between interframe pixels, thereby realizing a great reduction in information amount.

As basic schemes of compressing and encoding moving image signals, a predictive encoding scheme and transformational encoding scheme are available. The predictive encoding scheme uses correlations in time domains. The transformational encoding scheme uses correlations in spatial domains. As a predictive encoding scheme, a motion compensation predictive scheme of encoding a difference signal between an original image and a predicted image obtained by motion compensation prediction is known. As a transformation encoding scheme, an orthogonal transformation scheme is known, in which a frame is divided into blocks each constituting of a plurality of pixels, the respective pixel components are orthogonally transformed into components in frequency domains in units of blocks by DCT (Discrete Cosine Transform), and the orthogonal transformation coefficients (DCT coefficients) of the resultant frequency components are quantized, thereby variable-length-encoding the quantized coefficients.

In general, a moving image encoding scheme as a combination of the above motion compensation prediction scheme and orthogonal transformation scheme is used. As such a scheme, a scheme called H261 and H263 has been standardized by ITU-T (International Telecommunication Union-Telecommunication Standardization Sector), and a scheme called MPEG (Moving Picture Experts Group) has been standardized by the image compression standardization group established under ISO (International Organization for Standardization). In this MPEG scheme, encoding is defined to be performed in units of blocks called macroblocks, each consisting of 16×16 pixels.

A general moving image encoding apparatus for encoding moving image signals by using a combination of the motion compensation prediction scheme and orthogonal transformation scheme in the above manner includes an intra-encoding scheme and inter-encoding scheme as encoding modes. In the intra-encoding mode, the respective pixel components in input frames are encoded in units of macroblocks without motion compensation prediction. In the inter-encoding scheme, difference values between a motion compensation predicted image and an original image are obtained, and the resultant data are encoded in units of macroblocks.

In this case, the encoding apparatus in the inter-frame encoding mode generates decoded image data by internally decoding the data obtained by encoding a given frame A. This data is referred to as local decoded image data and stored in the frame memory. In encoding another frame B, the encoding apparatus performs motion estimation by using both the local decoded image data stored in the frame memory and the input image data, and generates a motion compensation predicted image on the basis of the estimation result. Difference values between this motion compensation predicted image and the original image are obtained, and the difference data are encoded and output to the transmission path.

The moving image decoding apparatus on the decoding side (destination) stores the decoded image data of the frame A in the frame memory as in the encoding side. Upon reception of the encoded difference data, first of all, the decoding apparatus generates a motion compensation predicted image from the decoded data of the frame A. If there is no error in the received data of the frame A, since the decoded image of the frame A matches the local decoded image of the frame A on the encoding apparatus side, as a matter of course, the motion compensation predicted image generated from this decoded data matches the motion compensation predicted image on the encoding apparatus side.

Since the encoding apparatus sends out the difference image between the original image and the motion compensation predicted image, the decoding apparatus can generate a decoded image of the frame B by adding the motion compensation predicted image to the received difference image.

The encoding apparatus generates a motion compensation predicted image by cutting data nearest to the pixel value of an input block from local decoded image data. If, therefore, the data of the frame A received by the decoding apparatus contains an error, a correct decoded image of the frame A cannot be generated. As a consequence, all images cut and generated from the error-containing portion of the motion compensation predicted image become erroneous data. If, therefore, the error-containing portion is cut as a plurality of motion compensation predicted image blocks, the error is spatially diffused. These erroneous data remain until refresh processing is performed by intra-encoding.

Same motion compensation prediction processing is performed for the next frame. As a consequence, on the decoding apparatus side, decoded images generated by using motion compensation predicted images generated from the erroneous data are stored in the frame memory and used to generate a motion compensation predicted image of the next frame. As such processing is repeated, the influences of erroneous data sequentially propagate. These erroneous data remain until refresh processing is performed by intra-encoding.

For the reasons described above, on the moving image encoding apparatus side, refresh must be periodically performed by intra-encoding to replace all the destroyed data with new image data, thus preventing the propagation of a data error. In addition, the influences of transmission encoding errors on the receiving side must be minimized.

With regard to refresh by intra-encoding, for example, according to ITU-T H.263, as the first scheme, a technique of performing refresh at least once while one macroblock is encoded 132 times is defined. To meet this definition, a technique of suppressing the propagation of a data error by cyclically refreshing a predetermined macroblock by intra-encoding is generally used.

In addition, according to MPEG-4, as the second scheme, a technique of performing refresh by aperiodically intra-encoding one macroblock is defined. In this technique, difference values between a predicted image and a current image are obtained in units of macroblocks, and macroblocks corresponding to difference values equal to or larger than a reference value are extracted as important areas that require refresh. Refresh is then sequentially performed for the macroblocks in the important areas in descending order of priority.

DISCLOSURE OF INVENTION

The above conventional refresh method has the following problems.

First of all, as in the first scheme defined in ITU-T H.263 described above, the following problem arises in the method of cyclically performing refresh. In this method, for a macroblock for which intra-encoding has been performed in a given frame, refresh is not performed until the next intra-encoding period. For this reason, if the data of a given macroblock is destroyed immediately after refresh is performed once by intra-encoding in one frame, a deterioration in image quality remains until the next refresh is performed, and the data error is diffused to neighboring macroblocks by motion compensation prediction processing.

As in the second scheme defined in MPEG-4 described above, the following problem arises in the method of performing refresh in units of macroblocks by aperiodical intra-encoding. In this method, if the number of macroblocks contained in an important area recognized as a refresh target in one frame is larger than the total number of macroblocks that can be actually refreshed in one frame, all the macroblocks recognized as refresh targets cannot be refreshed within one frame. In this case, even if it is determined that a given macroblock needs to be refreshed, when the priority of this macroblock is low, the macroblock is not refreshed. For this reason, if new macroblocks are extracted as refresh targets in the next frame, the number of macroblocks as refresh targets, including macroblocks that remain unrefreshed, increases. As a consequence, a residual deterioration in image quality gradually increases.

In addition, whether a given macroblock is a refresh target or not is determined by only the pixel difference value in one frame. Assume that this pixel difference value is large. Even in this case, if the number of DCT coefficients is small upon discrete cosine transform, the amount of encoded data used for one macroblock decreases, and the probability of mixing of an error decreases. Therefore, correct determination cannot be made by the technique of performing determination on the basis of only the pixel difference value in one frame.

The present invention has been made to solve these problems, and has as its object to provide an moving image encoding apparatus which can accurately determine the necessity of refresh by intra-encoding in the inter-frame encoding mode, and prevent from diffusing a data error, even if it occurs, by motion compensation prediction processing.

It is an object of the present invention, in particular, to prevent a deterioration in image quality from remaining and a data error from diffusing when refresh is cyclically performed. It is another object of the present invention to prevent unrefreshed macroblocks from remaining and remaining blocks from increasing in number when aperiodical refresh is performed in units of macroblocks. It is still another object of the present invention to properly determine whether a macroblock in one frame is a refresh target or not.

In order to achieve the above objects, a moving image encoding apparatus according to the present invention is configured in the following manner.

(1) A moving image encoding apparatus including block generating means (12) for receiving moving image data in units of frames, dividing the received data into a plurality of blocks, and outputting the data of the respective blocks in a predetermined order, and mode-specific encoding means (11, 13–20), having intra-encoding mode and inter-frame encoding mode, for encoding in a designated mode the data of the respective blocks sequentially output from the block generating means, is characterized by comprising:

information extraction means (21, 24) for extracting information for determination of a degree of influence of a data error from an encoded block processed by the mode-specific encoding means (11, 13–20);

parameter value control means (22) for, when intra-encoding is performed by the mode-specific encoding means (11, 13–20), setting an initial value as a parameter value of a corresponding block in advance, comparing the information extracted by the information extraction means (21, 24) with a predetermined reference value, and updating and storing the parameter value on the basis of the comparison result; and intra/inter determination means (23) for, when data of a block of a next frame, output from the block generating means (11), is to be encoded, comparing a parameter value of a corresponding block, stored in the parameter value control means (22), with a predetermined prescribed value, determining on the basis of the comparison result whether to execute refresh by intra-encoding, and designating a mode based on the determination result with respect to the mode-specific encoding means (11, 13–20).

(2) The moving image encoding apparatus of (1) is characterized in that the mode-specific encoding means (11, 13–20) encodes pixel components in an input frame in units of blocks without performing motion compensation prediction in the intra-encoding mode, and obtaining difference values between an original image and a motion compensation predicted image obtained by motion compensation prediction and encoding the difference values in units of blocks in the inter-frame encoding mode.

(3) The moving image encoding apparatus of (1) is characterized in that the information extraction means (21) extracts a generated encoded data amount from an encoded output from the mode-specific encoding means as information for determination of the degree of influence of the data error.

(4) The moving image encoding apparatus of (1) is characterized in that when the mode-specific encoding means (11, 13–20) performs discrete cosine transform processing for block data, the information extraction means (24) extracts a total number of non-zero coefficients of coefficients obtained by the discrete cosine transform processing as information for determination of the degree of influence of the data error.

In the moving image encoding apparatus having the arrangements of (1) to (4), the information extraction means (21, 24) extracts information (the generated encoded data amount in (2) and the total non-zero coefficient count in (3)) for the determination of the degree of influence of a data error from each encoded block, a reference value for extracted information is set in the parameter value control means (22) as an update condition for a parameter value in each block, and a prescribed parameter value is set in the intra/inter determination means (23) as a criterion for the selection of the intra-encoding mode. In the inter-frame encoding mode, for a block in which the extracted information obtained by the information extraction means (21, 24) is larger than the reference value, the parameter value control means (22) updates the parameter value of the block. The intra/inter determination means (23) determines that a data error is likely to occur and have a considerable influence in a block in which the parameter value is continuously updated and becomes larger than a boundary value, and switches the current mode to the intra-encoding mode to perform refresh operation.

With this processing, whether refresh is required for each macroblock in one frame can be properly determined. Even if the technique of cyclically performing refresh by intra-encoding is used, a macroblock that requires refresh is refreshed when it is required upon switching to the intra-encoding mode without waiting for the next refresh cycle. This makes it possible to prevent a deterioration in image quality due to a data error from remaining and a data error from diffusing.

(5) The moving image encoding apparatus of (1) is characterized by further comprising reference value/prescribed value changing means (25) for detecting an error rate in a transmission path, and changing at least one of a reference value held in the parameter value control means and a prescribed value held in the intra/inter determination means (23) on the basis of the detected error rate.

According to the arrangement of (5), an error rate in a transmission path is detected, and both or one of the update reference value for updating the parameter value and the criterion value for the execution of the intra-encoding mode is changed in accordance with the detected error rate, thereby setting a condition for the execution of refresh operation in the intra-encoding mode in accordance with the error rate in the transmission path. This can prevent a deterioration in image quality from remaining on the moving image decoding apparatus side.

(6) The moving image encoding apparatus of (1) is characterized by further comprising encoded data storage means (26) for storing encoded data output from the mode-specific encoding means (11, 13–20) in units of blocks, and reference value/prescribed value changing means (27) for obtaining an encoded data amount stored in the means (26), and changing at least one of a reference value held in the parameter value control means and a prescribed value held in the intra/inter determination means (23) on the basis of the encoded data amount.

According to the arrangement of (6), both or one of the update reference value for updating the parameter value and the criterion value for the execution of intra-encoding is changed by using the encoded data storage means (26) for keeping the transmission rate constant in accordance with the amount of encoded data stored in the encoded data storage means (26), thereby setting a condition for the execution of refresh operation in the intra-encoding mode in accordance with the amount of encoded transmission data. This can prevent a deterioration-in image quality from remaining on the moving image decoding apparatus side.

(7) The moving image encoding apparatus of (1) is characterized in that the parameter value control means (22) adds one to the parameter value when information extracted by the information extraction means is larger than a reference value, and adds 0 to the parameter value otherwise.

According to the arrangement of (7), it can be determined for each block from a parameter value that the generated encoded amount or total zero-coefficient count becomes large upon continuous execution of inter-encoding.

BEST MODE FOR CARRYING OUT OF THE INVENTION

Embodiments of the present invention will be described in detail below with reference to the views of the accompanying drawing.

First Embodiment

Figure 1:
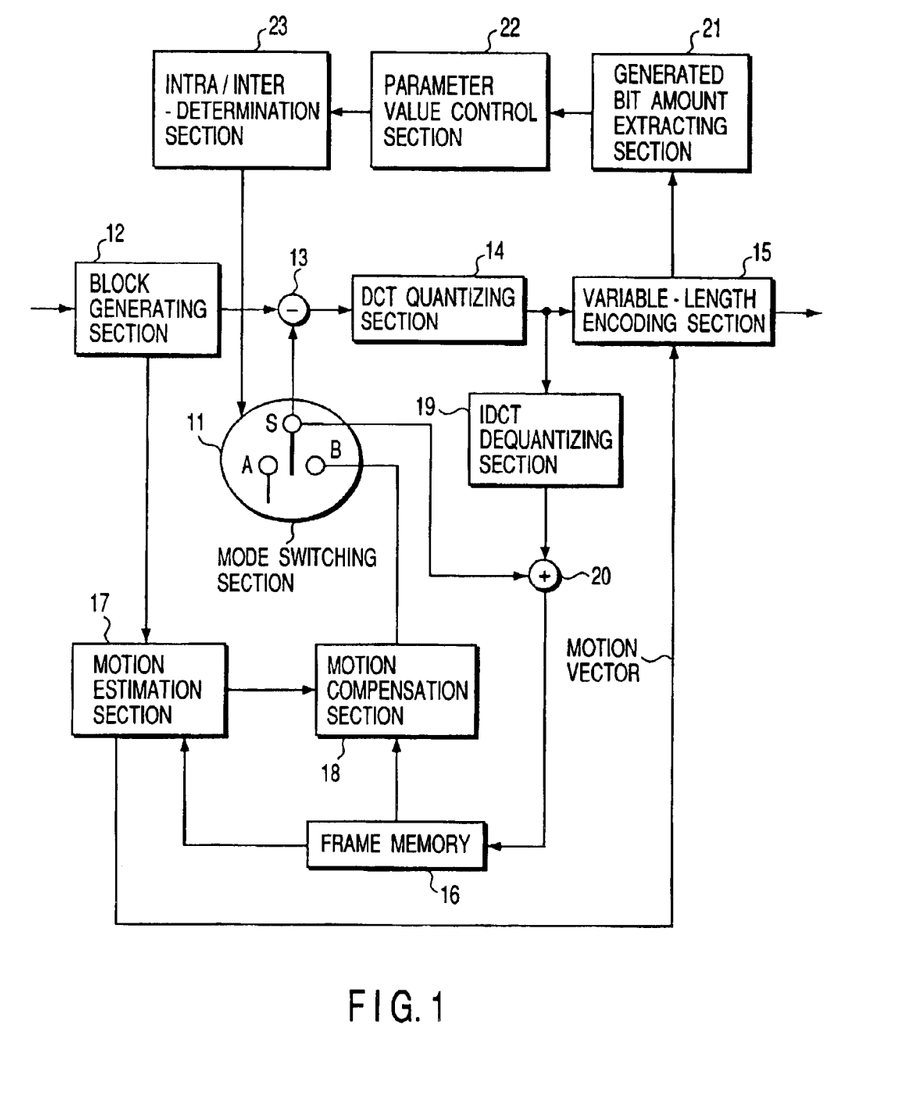
FIG. 1 is a block diagram showing the arrangement of a moving image encoding apparatus according to the first embodiment of the present invention.

FIG. 1 is a block diagram showing the arrangement of a moving image encoding apparatus according to the first embodiment of the present invention.

A moving image encoding apparatus according to the first embodiment is characterized in that the number of encoded bits generated by variable-length-encoding data obtained by DCT coefficient quantization are monitored in units of macroblocks, thereby choosing between intra-encoding and inter-encoding for macroblocks to be processed in the next frame. More specifically, if the amount of encoded data generated by variable length encoding is large, it is determined that a large variation is occurring in the input image. In accordance with this determination, the number of bits of encoded data is counted. More specifically, if the amount of encoded data generated by variable length encoding is large, it is determined that a large variation is occurring in the input image. In accordance with this determination, the number of bits of encoded data is counted. When the number of times this count value becomes larger than a reference value exceeds a predetermined value, refreshing operation is performed by intra-encoding.

The moving image encoding apparatus shown in FIG. 1 is comprised of a mode switching section 11, block generating section 12, subtracter 13, DCT (Discrete Cosine Transform)-quantizing section 14, variable-length encoding section 15, frame memory 16, motion estimation section 17, motion compensation section 18, IDCT (Inverse Discrete Cosine Transform)-dequantizing section 19, adder 20, generated bit amount extracting section 21, parameter value control section 22, and intra/inter determination section 23.

Encoding processes performed by this moving image encoding apparatus are roughly classified into processes in the intra-encoding mode of directly encoding each pixel information in an input frame without motion compensation prediction and processes in the inter-frame encoding mode of encoding difference information between an original image and a motion compensation predicted image obtained by motion compensation prediction.

An arrangement for processing in the intra-encoding mode will be described first.

Referring to FIG. 1, in the intra-encoding mode, a switching contact S of the mode switching section 11 is connected to a contact A in the open state. Moving image data (luminance information and color difference information) obtained by digital processing in an image input section (not shown) are supplied to the block generating section 12 in units of frames. The block generating section 12 divides each frame of the input moving image data in units of sets of a predetermined number of pixels into a plurality of blocks (macroblocks), combines the respective pixels data in units of blocks, and outputs the resultant data as block data. Each divided block data is supplied to the DCT-quantizing section 14 through the subtracter 13. In this case, in the intra-encoding mode, since the switching contact S of the mode switching section 11 is connected to the contact A in the open state, the data input to the subtracter 13 is directly output to the DCT-quantizing section 14.

The DCT-quantizing section 14 obtains DCT coefficients by discrete-cosine-transforming the input block data, and quantizes the DCT coefficients. The resultant quantized data is supplied to the variable-length encoding section 15. The variable-length encoding section 15 variable-length-encodes the quantized DCT coefficient data input in units of blocks, together with control data such as a block mode and parameters. This variable-length encoding is processing in which a short code is assigned to a signal with a high probability of occurrence, and a long code is assigned to a signal with a low probability of occurrence, thereby decreasing the average code length. This processing result is output as intra-encoded data.

An arrangement for processing in the inter-frame encoding mode will be described next.

Referring to FIG. 1, in the inter-frame encoding mode, the switching contact S of the mode switching section 11 is connected to a contact B to which motion compensation predicted image data is supplied. Local decoded image data forming a motion compensation predicted image of the next input frame by the processing to be described late is stored in the frame memory 16 in units of frames. This local decoded image data is supplied to the motion estimation section 17, together with block data output from the block generating section 12. The motion estimation section 17 compares the local decoded image data with the original image block data of the input frame output from the block generating section 12 to detect the motion vector of the input frame. More specifically, the moving direction and distance of the object are detected by referring to the values of neighboring pixels one or more frames preceding the current frame. The resultant motion vector data is supplied to the motion compensation section 18 and variable-length encoding section 15.

The motion compensation section 18 generates predicted image data corresponding to an original image block from a local decoded image based on neighboring pixels one or more frames preceding the current frame by extracting the value of a pixel corresponding to the motion vector detected by the motion estimation section 17 as a prediction value. This predicted image data is supplied to the subtracter 13 through the mode switching section 11 in units of blocks. The subtracter 13 calculates difference image data between the predicted image data and the original image block data of the input frame input from the block generating section 12. This difference image data is supplied to the DCT-quantizing section 14 to be converted into DCT coefficient quantization data by DCT and quantization. This data is supplied to the variable-length encoding section 15. This variable-length encoding section 15 then variable-length-encodes this data together with control data such as a block mode, parameters, and motion vector and outputs the resultant data as inter-encoded data.

In the above inter- and inter-frame encoding modes, an output from the DCT-quantizing section 14 is supplied to the IDCT-dequantizing section 19. The IDCT-dequantizing section 19 performs dequantization and inverse DCT-processing for the output data from the DCT-quantizing section 14. In intra-encoding, this processing result is supplied as local decoded image data to the frame memory 16 through the adder 20 and stored in units of frames. In the inter-frame encoding mode, the difference image data obtained by the IDCT-dequantizing section 19 is supplied to the adder 20. The adder 20 adds the motion compensation predicted image data supplied through the mode switching section 11 to the difference image data and decodes the data. The resultant data is then stored in the frame memory 16 in units of frames. The image data stored in the frame memory 16 is used for motion compensation prediction of the next frame.

An arrangement for performing intra/inter switching control on the mode switching section 11 will be described next.

The amount of encoded bits generated by the variable-length encoding section 15 is monitored by the generated bit amount extracting section 21 in units of macroblocks. More specifically, the generated bit amount extracting section 21 measures a bit count MB_bits of variable-length encoded data from the variable-length encoding section 15 in units of macroblocks, and supplies the count result to the parameter value control section 22.

The parameter value control section 22 compares the encoded data bit count MB_bits input in units of macroblocks with a preset reference value bits_Thr, and updates a parameter value T(n) (n represents the nth macroblock output from the block generating section 12) corresponding to the comparison result. The update result is supplied to an intra/inter determination section 23.

The intra/inter determination section 23 compares the input parameter value T(n) with a preset boundary value refresh_Thr to determine the intra-encoding mode or inter-frame encoding mode in accordance with the comparison result, generates a control signal for setting the corresponding encoding mode, and outputs it to the mode switching section 11.

The overall flow of processing for encoding a 1-frame moving image in the moving image encoding apparatus having the above arrangement will be described with reference to the flow chart of FIG. 2.

The block generating section 12 divides pixel data constituting 1-frame moving image, input from the image input section (not shown), into macroblocks each having 16×16-pixel luminance data and two 8×8-pixel color difference data (steps S201 and S202). The respective block data are output from the block generating section 12 in a predetermined order, and it is determined according to the procedure shown in FIG. 3 whether intra-encoding or inter-encoding is performed (step S203). With regard to an initial frame or a frame exhibiting no correlation with previous frame, all the block data are processed in the intra-encoding mode, and the parameter value T(n) of each block is reset to 0.

In step S203, the subtracter 13 calculates the difference between 0 and the data of each macroblock for which the intra-encoding mode is selected (step S211). The DCT-quantizing section 14 converts this difference data into DCT coefficients in units of 8×8-pixel blocks by discrete cosine transform (so-called DCT computation) and quantizes the DCT coefficients (steps S212 and S213). Thereafter, the variable-length encoding section 15 variable-length-encodes the DCT coefficient quantization data together with mode information and the like, and outputs the resultant data as intra-encoded data (step S214).

The DCT coefficient data quantized by the DCT-quantizing section 14 is subjected to dequantization and inverse cosine transform (inverse DCT computation) concurrently with the processing in step S214, and the resultant data is stored as local decoded image data for motion compensation prediction for the next frame in the frame memory 16 (steps S208 to S210).

In step S203, the motion estimation section 17 compares the data of a macroblock for which the inter-frame encoding mode is selected with the local decoded image data stored in the frame memory 16 to calculate a motion vector (step S204). The motion compensation section 18 then forms a motion compensation predicted image based on local decoded images from the local decoded image data of temporally different frames, stored in the frame memory 16, and the motion vector calculated by the motion detecting section 17 (step S205). The subtracter 13 obtains difference values between the pixel data of the block output from the block generating section 12 and the pixel data of the predicted image of the corresponding block, thereby forming a difference image (step S206).

The DCT-quantizing section 14 performs DCT processing and quantization for this difference image data in units of 8×8-pixel blocks (steps S212 and S213), thus obtaining quantized DCT coefficient data. In the inter-frame encoding mode, the IDCT-dequantizing section 19 performs dequantization and inverse DCT processing for the quantized DCT coefficient data (steps S207 and S208). The adder 20 adds the motion compensation predicted image data to the resultant data to form an internal decoded image (step S209). The resultant decoded image data is stored in the frame memory 16 (step S210). This stored image data is used for motion compensation prediction of the next frame.

The variable-length encoding section 15 variable-length-encodes the quantized DCT coefficient data after DCT-quantization in units of macroblocks, together with control data such as encoding mode information and motion vector, and outputs the resultant data as inter-encoded data (step S214).

If the macroblock variable-length-encoded in step S214 is not the final block of the input frame, the flow returns to step S201 to start encoding processing for the next frame (step S215).

The intra/inter determination processing in step S203 will be described next with reference to the flow chart of FIG. 3. Note that a symbol (A) in FIG. 3 is connected to "(A)" in FIG. 2, and indicates that processing continuously performed from "(A)" in FIG. 2.

Figure 2:
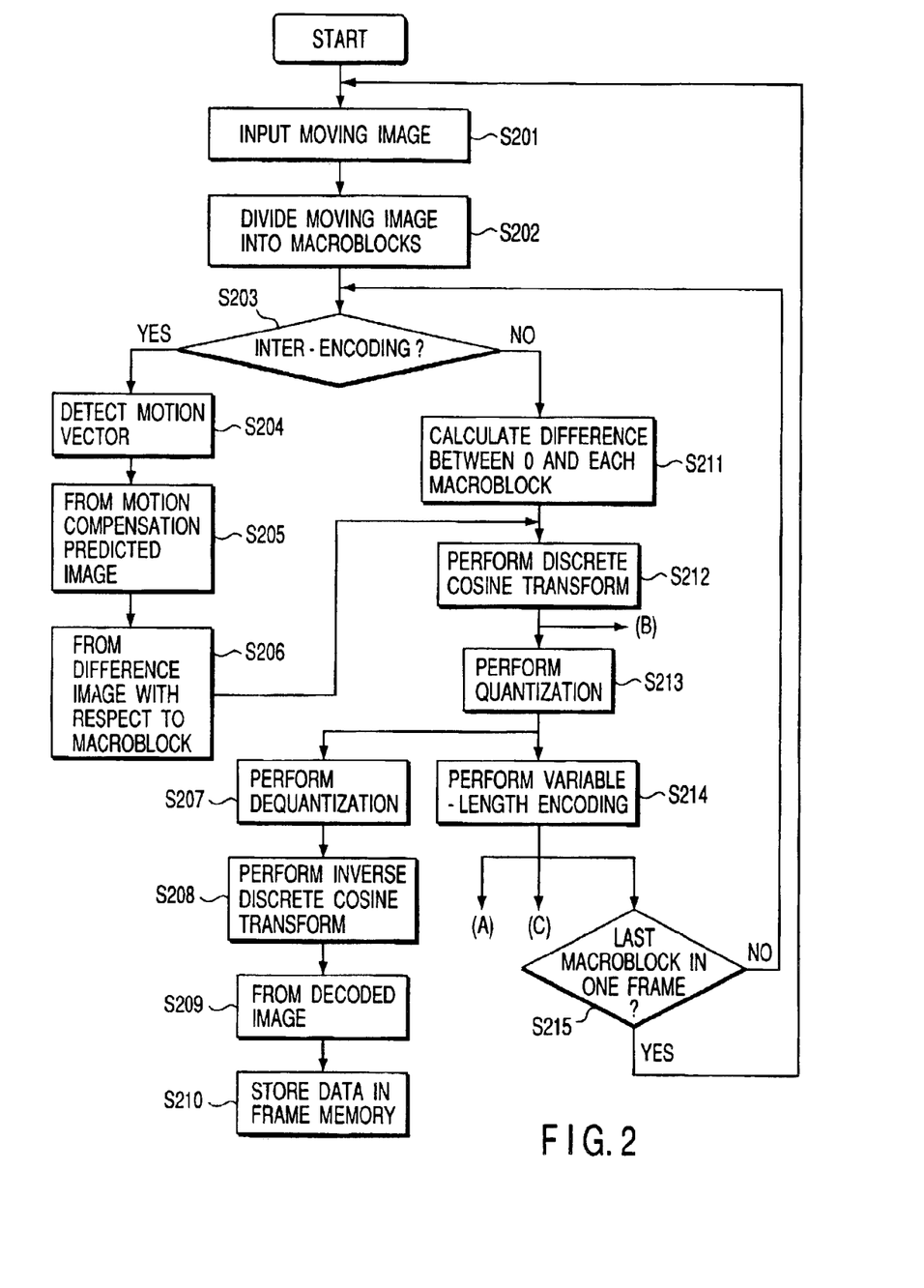
FIG. 2 is a flow chart showing a procedure for encoding in the moving image encoding apparatus according to the first to fourth embodiments.
Figure 3:
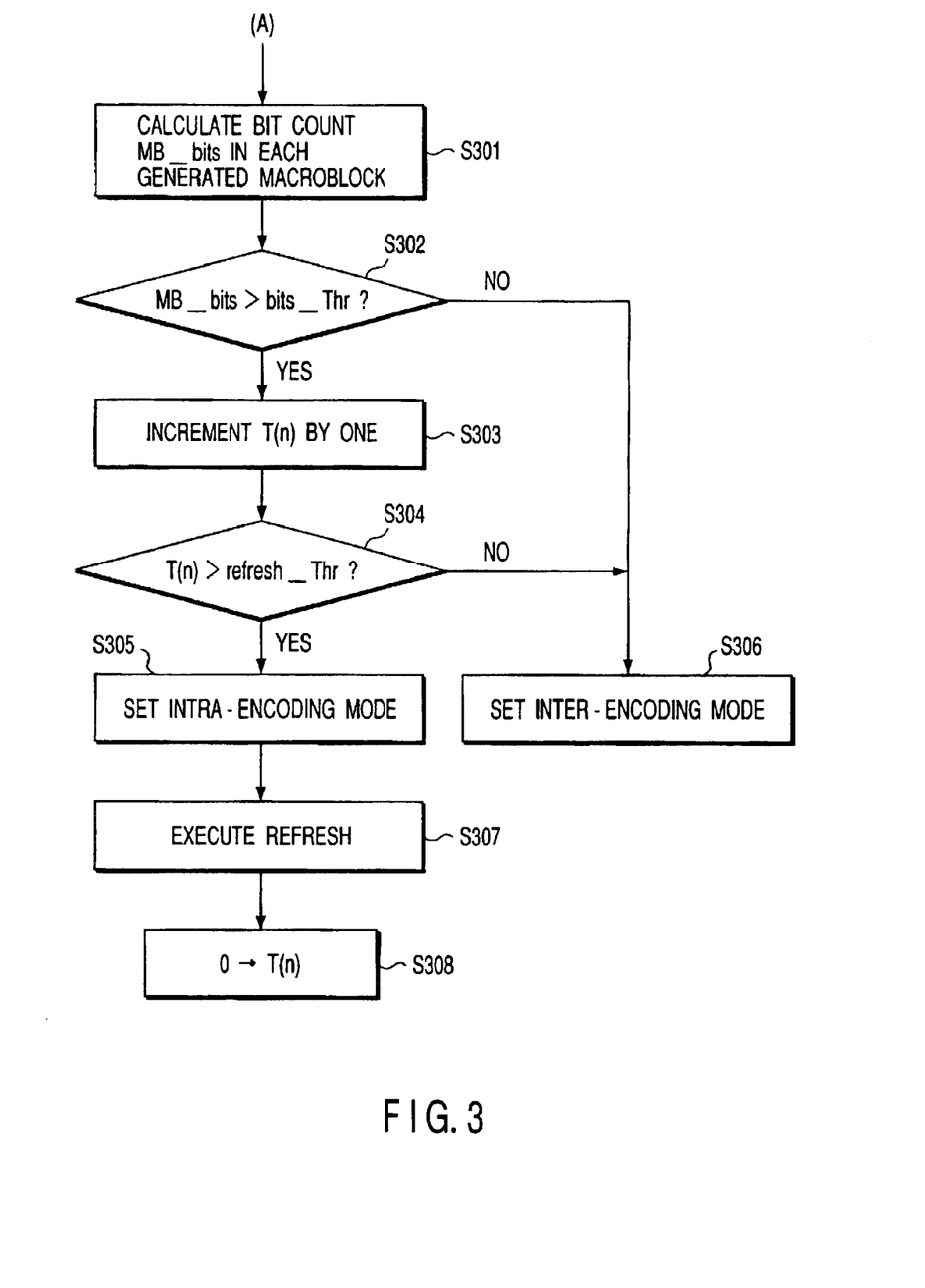
FIG. 3 is a flow chart showing a procedure for executing refresh by intra-encoding in the first embodiment.

Assume that the quantized DCT coefficient data of the nth macroblock is variable-length-encoded by the variable-length encoding section 15 in step S214 in FIG. 2. In this case, the number of generated bits of the encoded data is monitored by the generated bit amount extracting section 21. That is, the generated bit amount extracting section 21 measures the generated bit count MB_bits of the macroblock generated by the variable-length encoding section 15 (step S301). This generated bit count MB_bits is sent to the parameter value control section 22.

The parameter value T(n) handled by the parameter value control section 22 is one of the parameters of the nth macroblock. The parameter value control section 22 compares the generated bit count MB_bits with the preset reference bit count bits_Thr (step S302). If the generated bit count MB_bits exceeds the reference value bits_Thr, the parameter value T(n) is incremented by one (step S303). Assume that the generated bit count MB_bits obtained by variable-length encoding of the nth macroblock is 100, and the present reference bit count bits_Thr is 75. In this case, since the generated bit count MB_bits exceeds the reference value bits_Thr, the parameter value T(n) is incremented by one.

The intra/inter determination section 23 compares the parameter value T(n) with the preset boundary value refresh_Thr before encoding of the nth macroblock is started in the next frame (step S304). If T(n)>refresh_Thr, a control signal is output to the mode switching section 11 to perform encoding in the intra-encoding mode.

As a consequence, in the mode switching section 11, the switching contact S is connected to the contact A so as to set the intra-encoding mode (step S305), and encoding is performed in the intra-encoding mode to execute refresh (step S307). Upon completion of encoding in the intra-encoding mode, the parameter value T(n) is reset to 0 (step S308).

If T(n)<refresh_Thr in step S304, a control signal is output to the mode switching section 11 to perform encoding in the inter-frame encoding mode. As a consequence, in the mode switching section 11, the switching contact S is connected to the contact B to set the inter-frame encoding mode to perform encoding in the inter-frame encoding mode (step S306).

In the moving image encoding apparatus of this embodiment, the bit count MB_bits of data variable-length-encoded in units of macroblocks is measured, the reference value bits_Thr as a condition for updating the parameter value T(n) in each block is set for the bit count MB_bits, and the boundary value refresh_Thr of the parameter value T(n) is set in advance as a criterion for the selection of the intra-encoding mode. In the inter-frame encoding mode, the bit count MB_bits of encoded data is measured in units of blocks, and when the count value MB_bits exceeds the reference value bits_Thr, the parameter value T(n) of the corresponding block is updated. A block from which a large amount of information is generated is more likely to receive an error than a block from which a small amount of information is generated. That a state wherein a large amount of information is generated is repeated several times indicates that the data of neighboring blocks are referred to by motion compensation to a high degree. In this case, if an error is present in the referred data, the error is likely to propagate spatially. For this reason, it is determined that the influence of a data error is large in a block in which the parameter value T(n) exceeds the boundary value refresh_Thr, and the current mode is switched to the intra-encoding mode to perform refresh operation.

As described above, in the moving image encoding apparatus of this embodiment, whether refresh is required can be accurately determined in units of macroblocks in one frame. Even if the technique of cyclically performing refresh by intra-encoding is used, refresh for a given macroblock is executed upon switching to the intra-encoding mode whenever refresh is required without waiting for the next refresh cycle. This makes it possible to prevent a deterioration in image quality due to a data error from remaining and the data error from diffusing.

Second Embodiment

Figure 4:
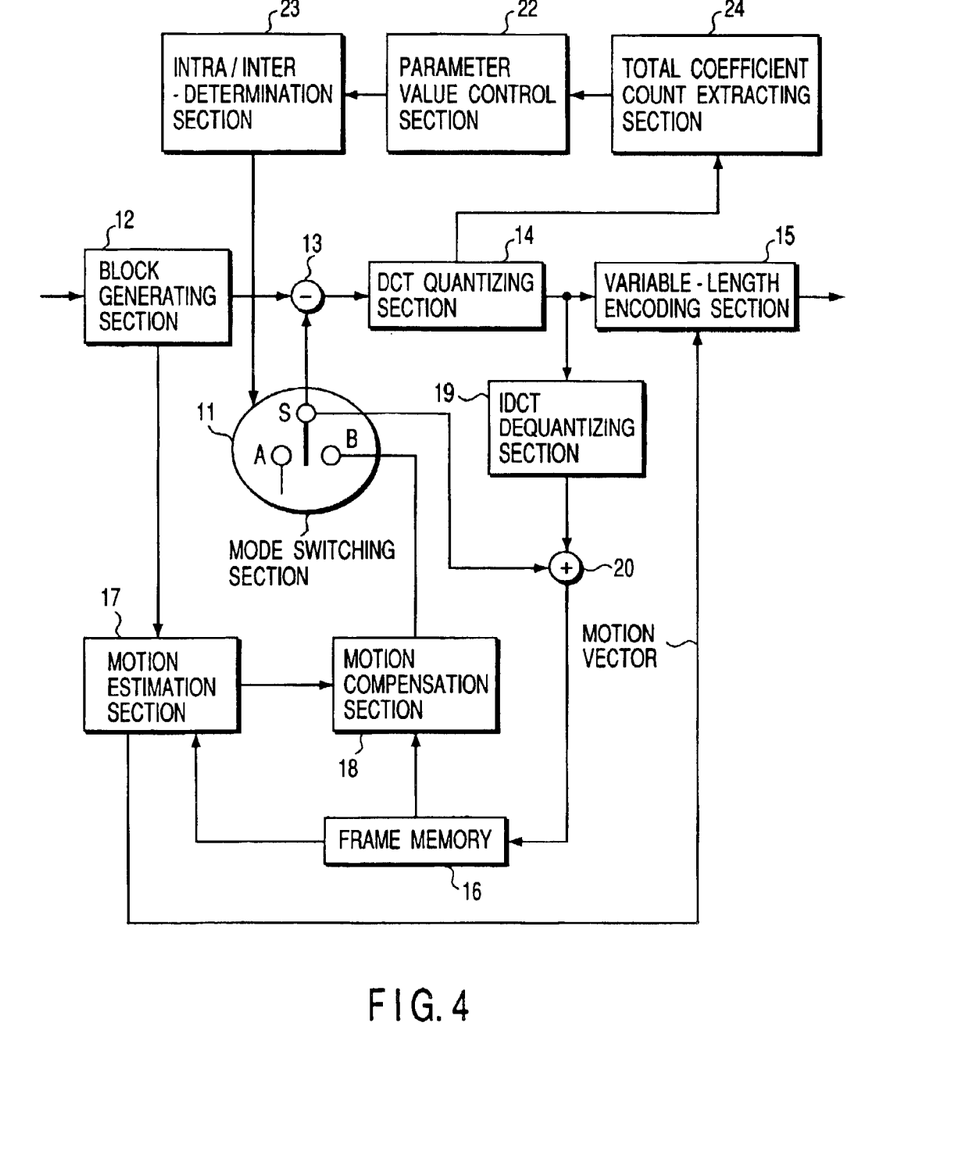
FIG. 4 is a block diagram showing the arrangement of a moving image encoding apparatus according to the second embodiment of the present invention.

FIG. 4 is a block diagram showing the arrangement of a moving image encoding apparatus according to the second embodiment of the present invention.

The moving image encoding apparatus of the second embodiment is characterized in that whether to intra-encode macroblocks in the next frame or inter-encode them is selected by monitoring whether a non-zero coefficient amount obtained by a DCT-quantizing section 14 is large or small in units of macroblocks. If the number of non-zero coefficients of the DCT coefficients obtained by DCT computation is large, it can be determined that a large variation is occurring in the input image. By using this, non-zero coefficients are counted, and it is determined in accordance with this count value whether to perform refresh operation or not.

The moving image encoding apparatus shown in FIG. 4 is comprised of a mode switching section 11, a block generating section 12, a subtracter 13, the DCT-quantizing section 14, a variable-length encoding section 15, a frame memory 16, a motion estimation section 17, a motion compensation section 18, an IDCT-dequantizing section 19, an adder 20, a parameter value control section 22, an intra/inter determination section 23, and a total coefficient count extracting section 24. The functional blocks denoted by the same reference numerals as in FIG. 1 have the same functions in FIG. 4.

The moving image encoding apparatus of the second embodiment differs from the apparatus of the first embodiment in that the total coefficient count extracting section 24 is used in place of the generated bit amount extracting section 21. The total coefficient count extracting section 24 extracts the total number of non-zero coefficients by counting non-zero coefficients of the DCT coefficients obtained by discrete cosine transform from the DCT-quantizing section 14 in units of macroblocks.

Figure 5:
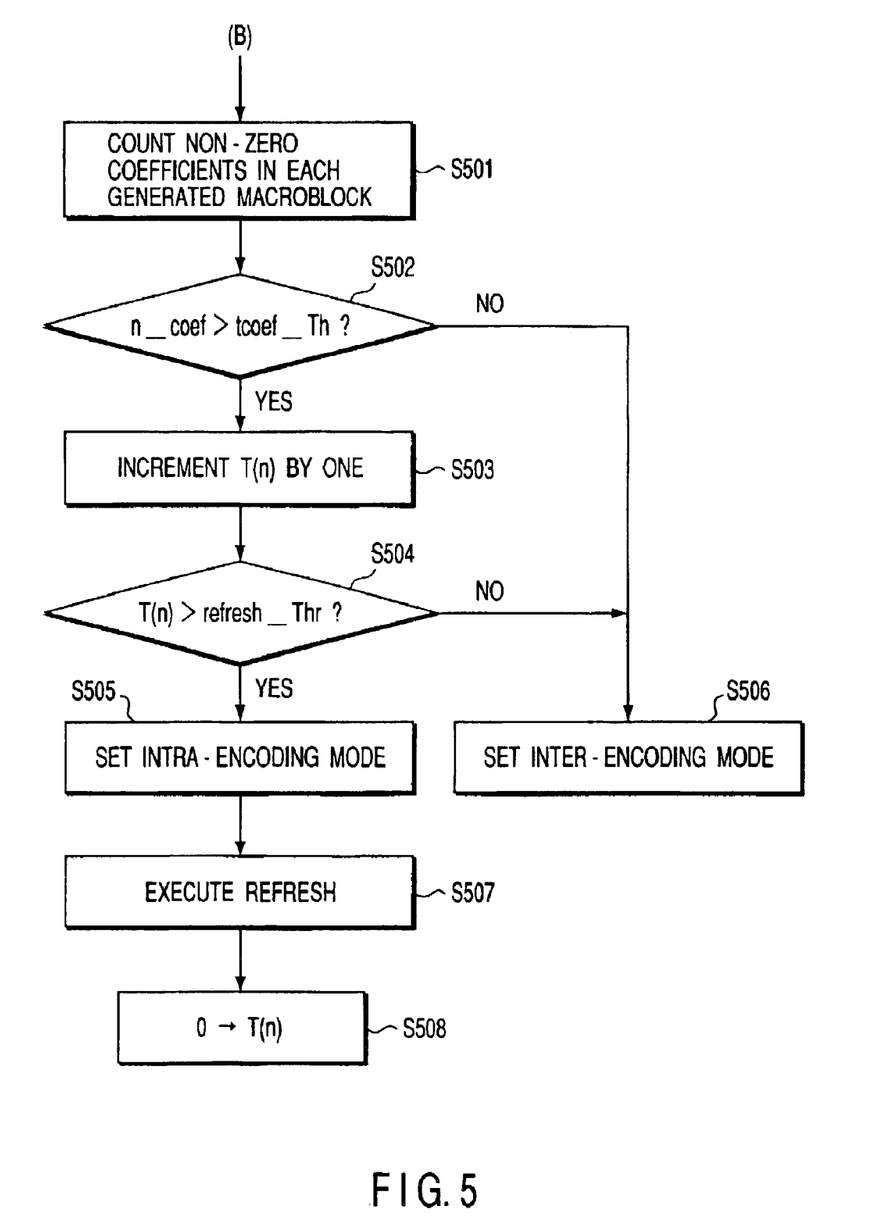
FIG. 5 is a flow chart showing a procedure for executing refresh by intra-encoding in the second embodiment.

In the moving image encoding apparatus having the above arrangement, the overall processing flow for moving image encoding of one frame is shown in FIG. 2, and a description thereof will be omitted. A procedure for executing refresh by intra-encoding in step S203 in FIG. 2 will be described with reference to the flow chart of FIG. 5. Note that a symbol (B) in FIG. 5 is connected to "(B)" in FIG. 2, and indicates that processing is continuously performed from "(B)" in FIG. 2.

Assume that the DCT coefficients of the nth macroblock are obtained in step S212 in FIG. 2. In this case, the total coefficient count extracting section 24 counts only non-zero coefficients of the DCT coefficients in the macroblock and extracts a total count n_coef (step S501). This total count n_coef of non-zero coefficients is sent to the parameter value control section 22. The parameter value control section 22 compares the total count n_coef of non-zero coefficients in the nth macroblock with a prescribed value tcoef_Th for non-zero coefficients (step S502).

If n_coef>tcoef_Th, the value of a parameter T(n) of the nth macroblock is incremented by one (step S503). The value of this parameter T(n) is sent to the intra/inter determination section 23.

The intra/inter determination section 23 compares the parameter value T(n) with a preset boundary value refresh_Thr before encoding of the nth macroblock is started in the next frame (step S504). If T(n)>refresh_Th4, a control signal is output to the mode switching section 11 to perform encoding in the intra-encoding mode. As a consequence, in the mode switching section 11, a switching contact S is connected to a contact A to set the intra-encoding mode (step S505). Encoding is then performed in the intra-encoding mode and refresh operation is executed (step S507). After encoding in the intra-encoding mode, the parameter value T(n) is reset to 0 (step S508).

If it is determined in step S502 that n_coef>tcoef_Th is not satisfied, or it is determined in step S504 that T(n)<refresh_Thr is satisfied, a control signal is output to the mode switching section 11 so as to perform encoding in the inter-frame encoding mode. As a consequence, in the mode switching section 11, the switching contact S is connected to a contact B to set the inter-frame encoding mode, and encoding is performed in the inter-frame encoding mode (step S506).

In the moving image encoding apparatus of this embodiment, only non-zero coefficients in the DCT coefficients in a macroblock are counted to extract the total count n_coef, and the prescribed value tcoef_Th as an update condition for the parameter value T(n) in each block is set with respect to the total count n_coef of non-zero coefficients. In addition, the boundary value refresh_Thr of the parameter value T(n) is set in advance as a criterion for the selection of the intra-encoding mode. In the inter-frame encoding mode, the total DCT non-zero coefficient count n_coef is obtained for each block, and when the total count n_coef exceeds the prescribed value tcoef_Th, the parameter value T(n) of the corresponding block is updated. A block from which a large amount of information is generated is more likely to receive an error than a block from which a small amount of information is generated. That a state wherein a large amount of information is generated is repeated several times indicates that the data of neighboring blocks are referred to by motion compensation to a high degree. In this case, if an error is present in the referred data, the error is likely to propagate spatially. For this reason, it is determined that the influence of a data error is large in a block in which the parameter value T(n) exceeds the boundary value refresh_Thr, and the current mode is switched to the intra-encoding mode to perform refresh operation.

As described above, in the moving image encoding apparatus of this embodiment, as in the first embodiment, whether refresh is required or not can be properly determined for each macroblock in one frame. Even if the technique of cyclically performing refresh by intra-encoding is used, refresh for a given macroblock is executed upon switching to the intra-encoding mode whenever refresh is required without waiting for the next refresh cycle. This makes it possible to prevent a deterioration in image quality due to a data error from remaining and the data error from diffusing.

In this case, in moving image encoding, the data of each macroblock is subjected to discrete cosine transform and quantization, and the resultant data is subjected to variable-length encoding. In general, for each macroblock, the number of non-zero coefficients is obtained. In the present invention, since non-zero coefficients-in DCT coefficients subjected to discrete cosine transform are counted in units of macroblocks, a non-zero coefficient count can be easily obtained without adding any new functional block.

Third Embodiment

Figure 6:
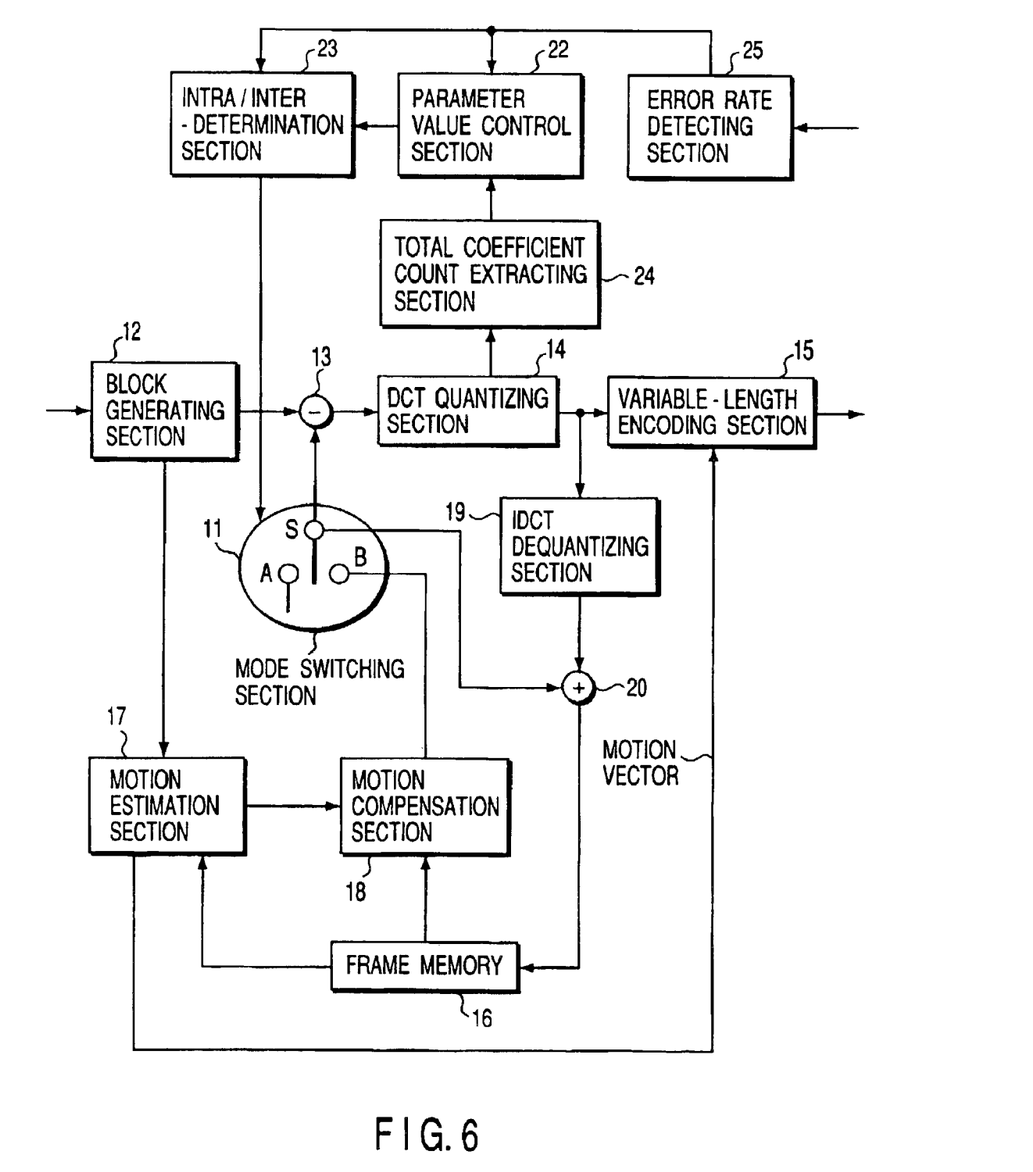
FIG. 6 is a block diagram showing the arrangement of a moving image encoding apparatus according to the third embodiment of the present invention.

FIG. 6 is a block diagram showing the arrangement of a moving image encoding apparatus according to the third embodiment of the present invention.

The moving image encoding apparatus according to the third embodiment is characterized in that both or one of an update condition for a parameter value T(n) and a criterion for the selection of intra/inter-encoding is updated in accordance with an error rate in a transmission path.

Referring to FIG. 6, the moving image encoding apparatus is comprised of a mode switching section 11, block generating section 12, subtracter 13, DCT-quantizing section 14, variable-length encoding section 15, frame memory 16, motion estimation section 17, motion compensation section 18, IDCT-dequantizing section 19, adder 20, parameter value control section 22, intra/inter determination section 23, total coefficient count extracting section 24, and error rate detecting section 25. The functional blocks denoted by the same reference numerals as in FIGS. 1 and 4 have the same functions in FIG. 6.

The moving image encoding apparatus of the third embodiment is based on the apparatus arrangement of the second embodiment, and additionally has the error rate detecting section 25. The error rate detecting section 25 detects the error rate of data errors that have occurred in a transmission path (not shown). The detected error rate is sent to the parameter value control section 22 and intra/inter determination section 23 to be used to update an update condition for a parameter value T(n) and a criterion for the selection of intra/inter-encoding. In the parameter value control section 22 and intra/inter determination section 23, a plurality of reference values for evaluating the error rate of transmission path errors are prepared in advance.

This embodiment is based on the arrangement of the second embodiment. However, the same effects can be obtained even if the third embodiment is based on the arrangement of the first embodiment.

Figure 7:
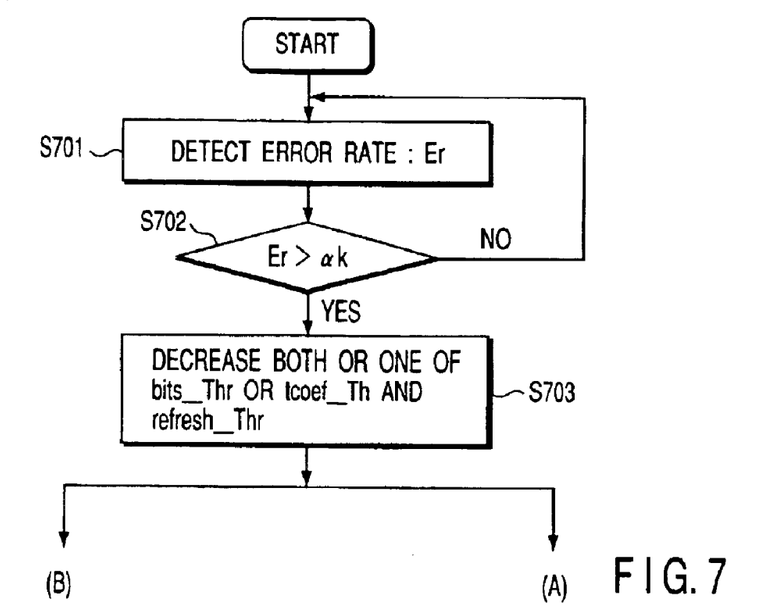
FIG. 7 is a flow chart showing a procedure for executing refresh by intra-encoding in the third embodiment.

In the moving image encoding apparatus having the above arrangement, the overall flow of processing for encoding a 1-frame moving image is shown in FIG. 2, and a description thereof will be omitted. The procedure for executing refresh by intra-encoding in step S203 in FIG. 2 will be described with reference to the flow chart of FIG. 7. Symbols (A) and (B) in FIG. 7 are respectively connected to "(A)" in FIG. 3 and "(B)" in FIG. 5, and indicate that processing is performed at the respective destinations. That is, the flow from "(A)" is based on the arrangement of the first embodiment, whereas the flow from "(B)" is based on the arrangement of the second embodiment.

First of all, data errors that have occurred in a transmission path are detected as an error rate Er by the error rate detecting section 25, and the result is sent to the parameter value control section 22 and intra/inter determination section 23 (step S701). Each of the parameter value control section 22 and intra/inter determination section 23 compares the input error rate Er with a plurality of reference values ($\alpha 1$ to $\alpha k$) stepwise (step S702).

If the detected error rate Er exceeds one of the reference values $\alpha 1$ to $\alpha k$, both or one of a reference total zero coefficient count value tcoef_Th (a reference bit count value bits_Thr when this embodiment is based on the arrangement of the first embodiment) preset as an update condition for the parameter value section 19 and a boundary value refresh_Thr preset as a criterion for the intra/inter determination section 23 is decreased (step S703).

Subsequently, the processing described above is performed at the destination indicated by "(B)" in FIG. 5 (or "(A)" in FIG. 3) by using the corrected reference total coefficient count value tcoef_Th (or reference bit count value bits_Thr) and boundary value refresh_Thr.

As described above, in the moving image encoding apparatus according to this embodiment, data errors in the transmission path are monitored, and a plurality of reference values of error rates in the transmission path are prepared. If the detected error rate exceeds one of the reference values, both or one of the update condition value for a parameter value and the criterion value for the selection of intra-encoding is decreased. With this operation, the problem that a deterioration in image quality remains on the moving image decoding apparatus side can be solved by increasing the number of macroblocks to be intra-encoded while finely performing refresh operation in the intra-encoding mode in units of macroblocks.

Fourth Embodiment

Figure 8:
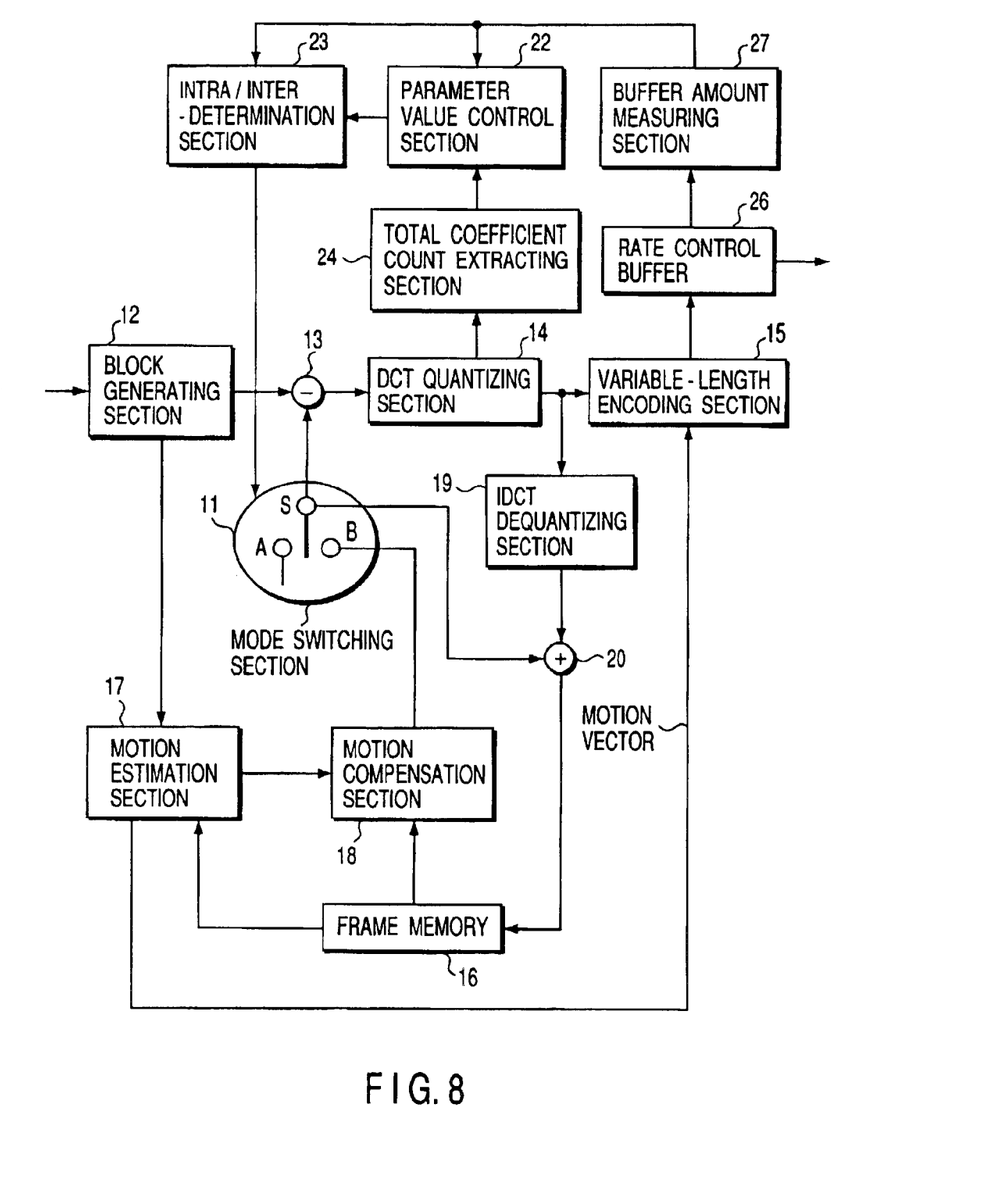
FIG. 8 is a block diagram showing the arrangement of a moving image encoding apparatus according to the fourth embodiment of the present invention.

FIG. 8 is a block diagram showing the arrangement of a moving image encoding apparatus according to the fourth embodiment of the present invention.

The fourth embodiment is characterized in that in the arrangement of the second embodiment, since a transmission rate control buffer is generally provided, both or one of the update condition for a parameter value T(n) and the criterion for the selection of intra/inter-encoding is changed in accordance with the encoded data stored in this rate control buffer.

Referring to FIG. 8, the moving image encoding apparatus is comprised of a mode switching section 11, block generating section 12, subtracter 13, DCT-quantizing section 14, variable-length encoding section 15, frame memory 16, motion estimation section 17, motion compensation section 18, IDCT-dequantizing section 19, adder 20, parameter value control section 22, intra/inter determination section 23, total coefficient count extracting section 24, rate control buffer 26, and buffer amount measuring section 27. The functional blocks denoted by the same reference numerals as in FIGS. 1 and 4 have the same functions in FIG. 8.

The moving image encoding apparatus according to the fourth embodiment is based on the apparatus arrangement of the second embodiment, and additionally has the rate control buffer 26 and buffer amount measuring section 27.

The rate control buffer 26 has a buffer memory for multiplexing variable-length-encoded image data with other data such as audio data and storing the multiplexed data. This amount of data stored in this buffer memory is controlled within a predetermined range to keep the encoding rate constant.

The buffer amount measuring section 27 counts the amount of encoded data stored in the rate control buffer 26 in units of frames, and compares the count value with a preset reference value. If the count value is equal to or smaller than the reference value, the result is sent to the parameter value control section 22 and intra/inter determination section 23.

This embodiment is based on the arrangement of the second embodiment. However, the same effects can be obtained even if the fourth embodiment is based on the arrangement of the first embodiment.

Figure 9:
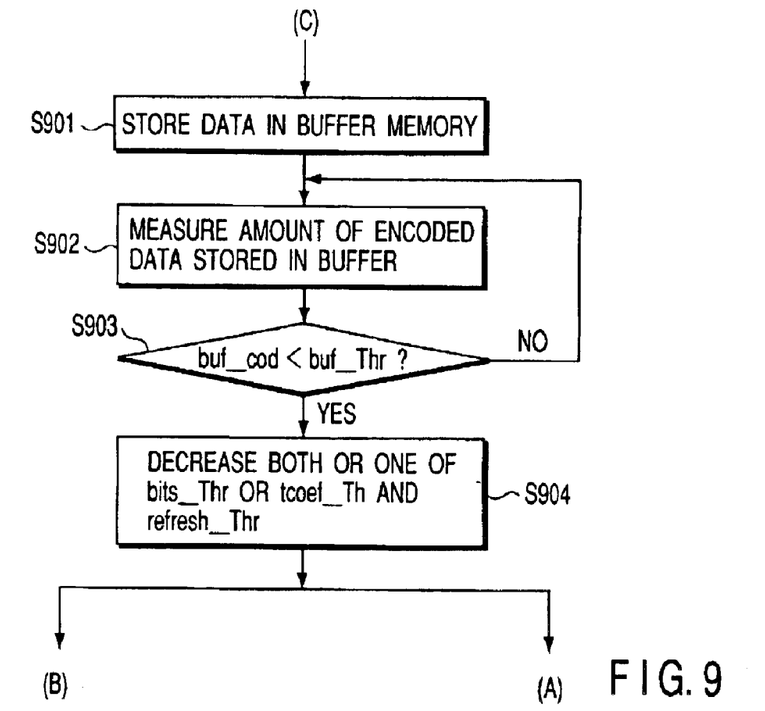
FIG. 9 is a flow chart showing a procedure for executing refresh by intra-encoding in the fourth embodiment.

In the moving image encoding apparatus having the above arrangement, the overall flow of processing for encoding a 1-frame moving image is shown in FIG. 2, and a description thereof will be omitted. The procedure for executing refresh by intra-encoding in step S203 in FIG. 2 will be described with reference to the flow chart of FIG. 9. Note that a symbol (C) in FIG. 9 is connected to "(C)" in FIG. 2, and symbols (A) and (B) are respectively connected to "(A)" in FIG. 3 and "(B)" in FIG. 5, and indicate that processing is performed at the respective destinations. The flow indicated by "(A)" is based on the arrangement of the first embodiment, whereas the flow indicated by "(B)" is based on the arrangement of the second embodiment.

The encoded DCT coefficient data of each block obtained in step S214 in FIG. 2 is stored in the buffer memory of the rate control buffer 26 (step S901). The buffer memory sends out the encoded data in units of frames. The buffer amount measuring section 27 measures an encoded data amount buf_cod stored in this buffer memory (step S902). The obtained measurement value is compared with a preset reference value buf_Thr (step S903).

If buf_Thr>buf_cod, a request signal is output to both or one of the parameter value control section 22 and intra/inter determination section 23 to change both or one of the update condition for a parameter value T(n) and the criterion for the selection of intra/inter-encoding. As a result, both or one of a reference total coefficient count value tcoef_Th (a reference bit count value bits_Thr when the fourth embodiment is based on the arrangement of the first embodiment), which is an update condition for the parameter value control section 22, and a boundary value refresh_Thr, which is a criterion for the intra/inter determination section 23, is decreased (step S904).

Subsequently, the above processing at the destination (B) in FIG. 5 (or (A) in FIG. 3) is performed by using the corrected reference total coefficient count value tcoef_Th (or reference bit count value bits_Thr) and boundary value refresh_Thr.

As described above, in the moving image encoding apparatus of this embodiment, the buffered data amount in the rate control buffer 26 is measured, and when the measured buffered data amount is equal to or smaller than a prescribed value, both or one of the update condition value for a parameter value and the criterion value for setting of intra-encoding is decreased. With this operation, the problem that a deterioration in image quality remains on the moving image decoding apparatus side can be efficiently solved by increasing the number of macroblocks to be intra-encoded while finely performing refresh operation in the intra-encoding mode in units of macroblocks.

In general, when the buffered data amount in the rate control buffer 26 becomes equal to or smaller than the prescribed value, dummy bits (so-called stuffing bits), which are discarded on the moving image decoding apparatus side, are added to output data to keep the transmission rate constant. In the fourth embodiment, the number of macroblocks subjected to refresh by intra-encoding is increased to increase the amount of encoded data stored in the rate control buffer. This makes it possible to decrease the number of dummy bits and perform refresh control efficiently using the amount of codes encoded when the amount of codes encoded is small.

The present invention is not limited to the above embodiments. Various changes and modifications of the embodiments can be made within the spirit and scope of the invention. For example, the encoding scheme based on motion compensation prediction has been exemplified as a prediction encoding scheme. However, the same effects as those described above can be obtained by using encoding techniques such as background prediction and inter-frame difference suppression.

As has been described above, according to the present invention, a parameter value update condition for each macroblock and a criterion for the selection of an encoding mode are set, and each parameter value is updated in accordance with the number of bits variable-length-encoded in units of macroblocks and the count value of non-zero coefficients in DCT coefficients subjected to discrete cosine transform. When this parameter value exceeds a present value, refresh operation based on intra-encoding encoding is executed. This makes it possible to accurately determine whether to require refresh in encoding each macroblock and suppress a deterioration in image quality due to a data error and diffusion of the data error.

When the error rate in the transmission path exceeds a predetermined value or the buffered data amount in the rate control buffer becomes equal to or less than a prescribed value, both or one of the update condition value for a parameter value and the criterion value for the selection of intra-encoding is decreased. Therefore, the problem that a deterioration in image quality remains on the moving image decoding apparatus side can be solved by efficiently increasing the number of macroblocks to be intra-encoded.

Furthermore, when the buffered data amount in the rate control buffer is defined, the buffered data amount is monitored, and an update condition and criterion are properly set in accordance with the buffered data amount. With this operation, even if the amount of codes to be encoded is small, refresh operation based on intra-encoding is properly executed, thus preventing the propagation of a data error.

What is claimed is:

1. A moving image encoding apparatus including
   block generating means for receiving moving image data in units of frames, dividing the received data into a plurality of blocks, and outputting the data of the respective blocks in a predetermined order, and
   mode-specific encoding means, having intra-encoding mode and inter-frame encoding mode, for encoding in a designated mode the data of the respective blocks sequentially output from said block generating means, characterized by comprising:
   information extraction means for extracting information for determination of a degree of influence of a data error from an encoded block processed by said mode-specific encoding means;
   parameter value control means for, when intra-encoding is performed by said mode-specific encoding means, setting an initial value as a parameter value of a corresponding block in advance, comparing the information extracted by said information extraction means with a predetermined reference value, and updating and storing the parameter value on the basis of the comparison result; and
   intra/inter determination means for, when data of a block of a next frame, output from said block generating means, is to be encoded, comparing a parameter value of a corresponding block, stored in said parameter value control means, with a predetermined boundary value, determining on the basis of the comparison result whether to execute refresh by intra-encoding, and designating a mode based on the determination result with respect to said mode-specific encoding means.

2. An apparatus according to claim 1, characterized in that said mode-specific encoding means encodes pixel components in an input frame in units of blocks without performing motion compensation prediction in the intra-encoding mode, and obtaining difference values between an original image and a motion compensation predicted image obtained by motion compensation prediction and encoding the difference values in units of blocks in the inter-frame encoding mode.

3. An apparatus according to claim 1, characterized in that said information extraction means extracts a generated encoded data amount from an encoded output from said mode-specific encoding means as information for determination of the degree of influence of the data error.

4. An apparatus according to claim 1, characterized in that when said mode-specific encoding means performs discrete cosine transform processing for block data, said information extraction means extracts a total number of non-zero coefficients of coefficients obtained by the discrete cosine transform processing as information for determination of the degree of influence of the data error.

5. An apparatus according to claim 1, characterized by further comprising reference value/boundary value changing means for detecting an error rate in a transmission path, and changing at least one of a reference value held in said parameter value control means and a boundary value held in said intra/inter determination means on the basis of the detected error rate.

6. An apparatus according to claim 1, characterized by further comprising:

encoded data storage means for storing encoded data output from said mode-specific encoding means in units of blocks; and reference value/boundary value changing means for obtaining an encoded data amount stored in said means, and changing at least one of a reference value held in said parameter value control means and a boundary value held in said intra/inter determination means on the basis of the encoded data amount.

7. An apparatus according to claim 1, characterized in that said parameter value control means adds one to the parameter value when information extracted by said information extraction means is larger than a reference value, and adds 0 to the parameter value otherwise.

* * * * *